(12) United States Patent
Räsänen et al.

(10) Patent No.: US 6,888,821 B2
(45) Date of Patent: May 3, 2005

(54) DYNAMIC MEDIA AUTHORIZATION IN MOBILE NETWORKS

(75) Inventors: Juha A. Räsänen, Espoo (FI); Igor Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/766,845

(22) Filed: Jan. 30, 2004

(65) Prior Publication Data

US 2004/0190453 A1 Sep. 30, 2004

Related U.S. Application Data

(60) Provisional application No. 60/445,799, filed on Feb. 10, 2003.

(51) Int. Cl.[7] .............................................. H04L 12/66
(52) U.S. Cl. ..................... 370/352; 370/235; 370/356; 370/231; 709/226; 709/227; 709/229
(58) Field of Search ................................. 370/229, 230, 370/231, 235, 352–356, 395.52; 709/226, 227, 229

(56) References Cited

U.S. PATENT DOCUMENTS

| | | | |
|---|---|---|---|
| 6,621,793 B2 * | 9/2003 | Widegren et al. | 370/230.1 |
| 2002/0120749 A1 * | 8/2002 | Widegren et al. | 709/227 |
| 2003/0156578 A1 * | 8/2003 | Bergenlid et al. | 370/352 |

OTHER PUBLICATIONS

3GPP US 23.207 V5.6.0 (Dec. 2002), Technical Specification "[rd] Generation Partnership Project; Technical Specification Group Services and System Aspects; End–to–end Quality of Service (QoS) concept and architecture"; (Release 5).

3GPP TS 29.207 V5.2.0 (Dec. 2002), Technical Specification, "3rd Generation Partnership Project; Technical Specification Group Core Network; Policy control over Go Interface", (Release 5).

3GPP TS 29.208 V5.2.0 (Dec. 2002), Technical Specification, "3rd Generation partnership Project; Technical Specification Group Cores Network; End to end Quality of Service (Qos) signaling flows" (Release 5).

* cited by examiner

*Primary Examiner*—Wellington Chin
*Assistant Examiner*—Raj Jain
(74) *Attorney, Agent, or Firm*—Antonelli, Terry, Stout & Kraus, LLP

(57) ABSTRACT

An network interface architecture is provided with solutions for dynamic media authorization and better management of QoS classes of a session (connection between users or mobile terminals) comprising a plurality of media streams within mobile networks such that, when media stream(s) are modified (new ones started and existing ones deleted) during the session, the traffic class of a session is defined by the highest traffic class requirement by the media flows belonging to the same session in order to eliminate the difference of transmission delays of media streams belonging to the same session and, therefore, improving the quality of the connection perceived by the end user.

4 Claims, 5 Drawing Sheets

DYNAMIC MEDIA AUTHORIZATION IN MOBILE NETWORKS

CROSS REFERENCE TO RELATED APPLICATION

This application makes reference to, incorporates the same herein, and claims all benefits accruing under 35 U.S.C. §120 from a provisional application earlier filed in the United States Patent & Trademark Office (USPTO) under 37 C.F.R. §1.53(c) on Feb. 10, 2003 and assigned Ser. No. 60/445,799.

BACKGROUND OF THE INVENTION

1. Technical Field

The present invention relates to mobile networks including end-to-end quality of service (QoS) management, and more particularly, relates to dynamic media authorization and management of QoS classes of a session (connection between users or mobile terminals, or between a mobile terminal and a server) comprising a plurality of different types of media streams within mobile networks.

2. Related Art

Modern mobile networks such as those networks standardized by 3GPP ($3^{rd}$ Generation Partnership Project) specifications including all GSM (Global System for Mobile Communications) and $3^{rd}$ generations of GSM networks, are seamless integration of digital cellular networks and personal communications systems to provide telecommunication services including, for example, mobile data network services and IP multimedia services.

Each 3GPP system may include a core network and a radio access network infrastructure using General Packet Radio Service (GPRS) and Enhanced Data Rates for Global Evolution (EDGE) technologies or supporting Universal Terrestrial Radio Access (UTRA) operable in both Frequency Division Duplex (FDD) and Time Division Duplex (TDD). The core network (CN) may be logically divided into circuit switched (CS) and packet switched (PS) domains with CN entities provided for user traffic and related signaling, and an IP Multimedia Subsystem (IMS) with core network (CN) entities provided for IP multimedia services. Some CN entities such as Home Subscriber Server (HSS), Home Location Register (HLR), Authentication Center (AuC), Visitor Location Register (VLR), and Equipment Identify Register (EIR) may be common to the PS and CS domains, while other CN entities such as Mobile Switching Center (MSC) and Gateway MSC are specific to the CS domain to handle circuit switched services to/from mobile stations, and Gateway GPRS (general packet radio service) Support Node (GGSN) and Serving GSN (SGSN) are specific to the PS domain to handle the packet transmission to/from the mobile stations.

For IP multimedia services, functional IMS entities, such as Call Session Control Function (CSCF), may be provided to handle CSCF related procedures, including establishing PDP (Packet Data Protocol, e.g., IP) context for IMS related signaling, registration and other procedures for IMS sessions. CSCF can act as Proxy CSCF (P-CSCF) to serve as a first contact point for a user equipment (UE) (i.e., device allowing a user to access to network services, such as, a mobile terminal) within the IP multimedia subsystem (IMS), Serving CSCF (S-CSCF) to handle session states in the network, or an Interrogating CSCF (I-CSCF) to serve as a contact point within an operator's network for all IMS connections destined to either a subscriber of that network operator or a roaming subscriber in a given service area. See, 3GPP Technical Specification (TS) 23.002, V5.9.0 (December 2002) "Network Architecture"; 3GPP TS 23.101, V4.0.0 (April 2002) "General UMTS Architecture"; and 3GPP TS 23.110, V4.0.0 (April 2001) "UMTS Access Stratum: Services and Functions"; and 3GPP Technical Specification (TS) 23.228, V6.0.1 (January 2003) "IP Multimedia Subsystem (IMS)". All 3GPP (GSM/3G) specifications can be found and downloaded from the 3GPP server under ftp://ftp.3gpp.org/specs, and are hereby incorporated by reference herein. In addition, mechanisms for creating, maintaining and updating 3GPP specifications (including different Releases of a given 3GPP specification with new or changed functionality) can also be found in 3GPP Technical Specification (TS) 21.900 V5.0.1 (September 2002) "Technical Specification Group Working Methods."

A Policy Decision Function (PDF) has been standardized to supervise the management of quality of service (QoS) classes of a session comprising a plurality of media streams, make policy decisions based on the session and media related information, including the maximum authorized traffic class for a given media flow between two users (mobile terminals), or between a mobile terminal and a server, and then exchange decision information with the GGSN via a Go interface, as set forth in the 3GPP TS 29.207 V.5.2.0 (December 2002) "Policy Control over Go Interface", Release 5; 3GPP TS 23.207 V.5.6.0 (December 2002) "End-To-End Quality of Service (QoS) Concept and Architecture", Release 5; and 3GPP TS 29.208 V.5.2.0 (December 2002) "End-To-End Quality of Service (QoS) signaling flows", Release 5. Such PDF may be integrated into the P-CSCF as set forth in the 3GPP Specification, Release 5 (December 2002), or alternatively, may be implemented in a separate network element that is separate from the P-CSCF as set forth in the 3GPP Specification, Release 6 (January 2003).

In general, when a session (connection) is established between user equipments (UEs) (e.g., mobile terminals), or between a mobile terminal and a server, and the session is modified (e.g. from bi-directional audio and unidirectional video to unidirectional video only), the traffic class is changed by the PDF (from conversational to streaming). This is because the session as established between user equipments (UEs) (e.g., mobile terminals), or between a mobile terminal and a server, comprises a bidirectional audio flow and a unidirectional video flow. The bi-directional audio flow is used for a real-time conversation and, consequently, requires a low delay real-time traffic class, i.e., the CONVERSATIONAL traffic class. The unidirectional video flow is used for transferring moving video pictures in one direction only. Such a unidirectional real-time video flow tolerates longer transmission delays and delay variations (a.k.a., jitter) because the sender does not expect to receive any responses. As a result, the unidirectional real-time flow typically uses a STREAMING traffic class in practice. If the session is modified, that is, if one of the bidirectional audio flow and the unidirectional video flow is terminated and removed from the session, the traffic class for bearer resources of the session needs to be changed by the PDF accordingly. For example, if the bidirectional audio flow with the CONVERSIONAL traffic class is removed from the session, the unidirectional video flow, with the STREAMING traffic class as a requirement by default, now has the "highest traffic class" of the session. Consequently, the PDF changes (i.e., downgrade) the traffic class for the bearer of the session from CONVERSATIONAL traffic class to STREAMING traffic class.

However, some parameters, such as buffer size in the receiving terminal are different in these traffic classes, the change of the traffic class with the inherent change of the transmission delay will cause buffer underflows at the receiving terminal or server, thereby reducing the quality of the connection perceived by the end user.

Another significant problem may occur, when a unidirectional (e.g. video) stream is added to an existing session comprising a bidirectional (e.g. audio) stream. The signalled traffic class request of the unidirectional video stream is typically streaming. The traffic class of the bidirectional session is conversational. If the media streams have a temporal relationship (e.g. verbal explanation of the video stream in the audio stream), the difference of the traffic classes will cause a difference in the transmission delays (due to different buffer lengths at the receivers to compensate the different delays and delay jitters in the transmission), thereby reducing the quality of the connection perceived by the end user.

Accordingly, there is a need for solutions that can be applicable to all systems in which one session (connection between users or mobile terminals, or between a mobile terminal and a server) may comprise a plurality of different types of media streams and that relate to dynamic media authorization and better management of quality of service (QoS) classes of a session (connection between users or mobile terminals, or between a mobile terminal and a server) comprising a plurality of different types of media streams within mobile networks such that, when media stream(s) are modified (new ones started and existing ones deleted) during the session, the traffic class of a session is defined by the highest traffic class requirement by the media flows belonging to the same session in order to eliminate the difference of transmission delays of media streams belonging to the same session and, therefore, improving the quality of the connection perceived by the end user.

SUMMARY OF THE INVENTION

Various aspects of the present invention are directed to solutions for dynamic media authorization and better management of quality of service (QoS) classes of a session (connection between users or mobile terminals, or between a mobile terminal and a server) comprising a plurality of different types of media streams within mobile networks such that, when one or more media streams are modified (new ones started and existing ones deleted) during the session, the traffic class of a session is defined by the highest traffic class requirement by the media flows belonging to the same session in order to eliminate the difference of transmission delays of media streams belonging to the same session and, therefore, improving the quality of the connection perceived by the end user.

In accordance with one aspect of the present invention, a Policy Decision Function (PDF) is provided in a mobile network to determine a maximum authorized traffic class for a given media flow of a session between two mobile terminals, or between a mobile terminal and a server. Such PDF is configured to determine if one or several media streams requiring the highest traffic class within a plurality of different types of media streams are removed from the session, when a session is established and is being modified between two mobile terminals or between a mobile terminal and a server, via a communication link; and maintain the used traffic class for the remaining media streams for the session, if the one or several media streams requiring the highest traffic class are removed from the session.

In accordance with another aspect of the present invention, a Policy Decision Function (PDF) is configured to determine if a unidirectional stream is added to the session comprising a bi-directional stream, when a session is established or modified between two mobile terminals or between a mobile terminal and a server, via a communication link; and to apply the highest traffic class, allocated to any of media streams of the session, to all media streams of the session during the lifetime of the session, if the unidirectional stream is added to the session comprising the bidirectional stream in a mobile network to determine a maximum authorized traffic class for a given media flow of a session between two mobile terminals or between a mobile terminal and a server, via the communication link.

In accordance with yet another aspect of the present invention, a computer readable medium is provided with instructions that, when executed by a mobile network, perform a method of determining a maximum authorized traffic class for a given media flow of a session between two mobile terminals, or between a mobile terminal and a server, including: determining if a unidirectional stream is added to a session comprising a bi-directional stream, when the session is established or modified between two mobile terminals, or between a mobile terminal and a server, via a communication link; and applying the highest traffic class, allocated to any of media streams of the session, to all media streams of the session during the lifetime of the session, if the unidirectional stream is added to the session comprising the bi-directional stream.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention is applicable for use with all types of networks supporting a plurality of different types of media streams, including, for example, $2^{nd}$ and $3^{rd}$ generations of GSM (Global System for Mobile Communications) networks, transit networks such as Internet, Intranets, local area networks (LANS) and ATM based transit networks, and terminating networks such as public switched telephone networks (PSTNs), ISDNs, IP networks/LANs, X.25 and Public Land Mobile Networks (PLMNs) and interconnected systems and related protocols used for voice, message, data and image transfers between systems in such mobile networks. However, for the sake of simplicity, discussions will concentrate mainly on a simple multimedia network including IP Multimedia Subsystem (IMS) entities for providing IP multimedia services.

Figure 1:
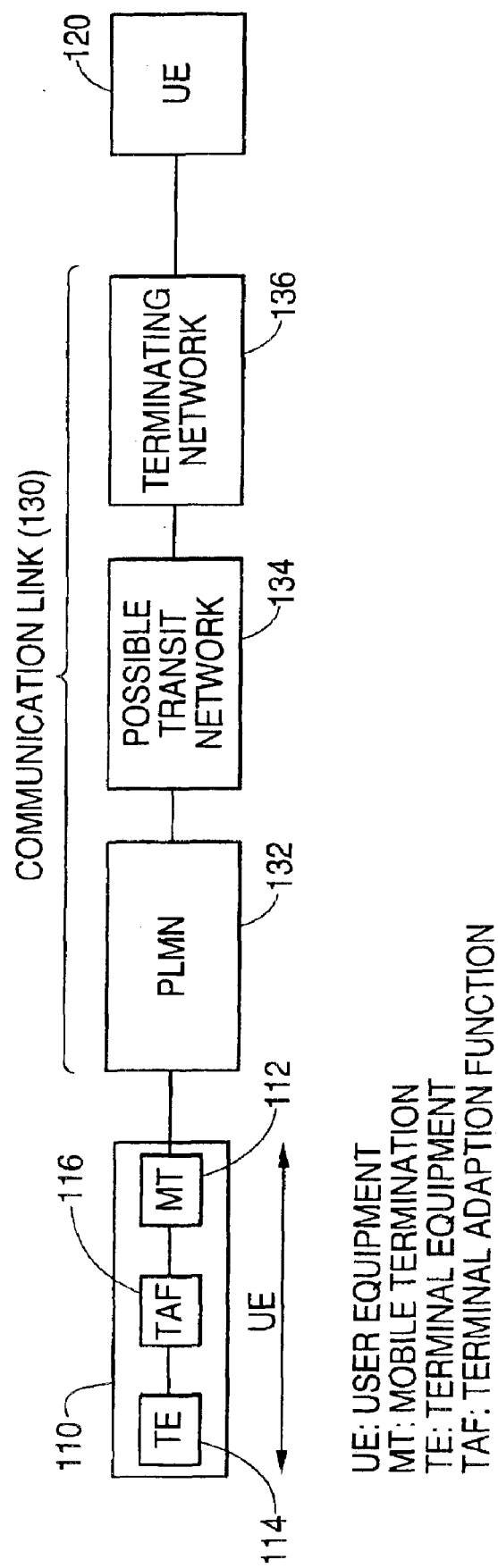
FIG. 1 illustrates an example network system architecture for providing telecommunication services including IP multimedia services according to the 3GPP Specification, Release 5.

Attention now is directed to the drawings and particularly to FIG. 1, an example network system architecture for providing telecommunication services including IP multimedia services according to the 3GPP Specification, Release 5, is illustrated. As shown in FIG. 1, the network system architecture 100 may broadly include, for example, an originating user equipment (UE) 110, a terminating user equipment (UE) 120 or vice versa, and a communication link 130 arranged to connect the user equipments (UEs) 110/120 and may span over a single network or different networks such as, for example, a Public Land Mobile Network (PLMN) 132, one or more transit networks 134 and a terminating network 136. The user equipment (UE) 110/120 may be any device or user terminal to allow a user to access to network services, including, for example, a remote server or a mobile terminal for GSM as defined in 3GPP TS 24.002, V5.0.0 (December 2001), Release 5.

Each UE 110/120 may include, for example, a mobile termination (MT) 112, a terminal equipment (TE) 114, and a terminal adaptation function (TAF) 116 arranged to perform radio transmission and related functions, and may contain end-to-end applications to support telecommunication services.

The transit network 134 may include, but not limited to, Internet, Intranet, a local area network (LAN) or an ATM based transit network. The terminating network 136 may include, but not limited to, a public switched telephone network (PSTN), an ISDN, an IP network/LAN, X.25 or another Public Land Mobile Network (PLMN).

Figure 2:
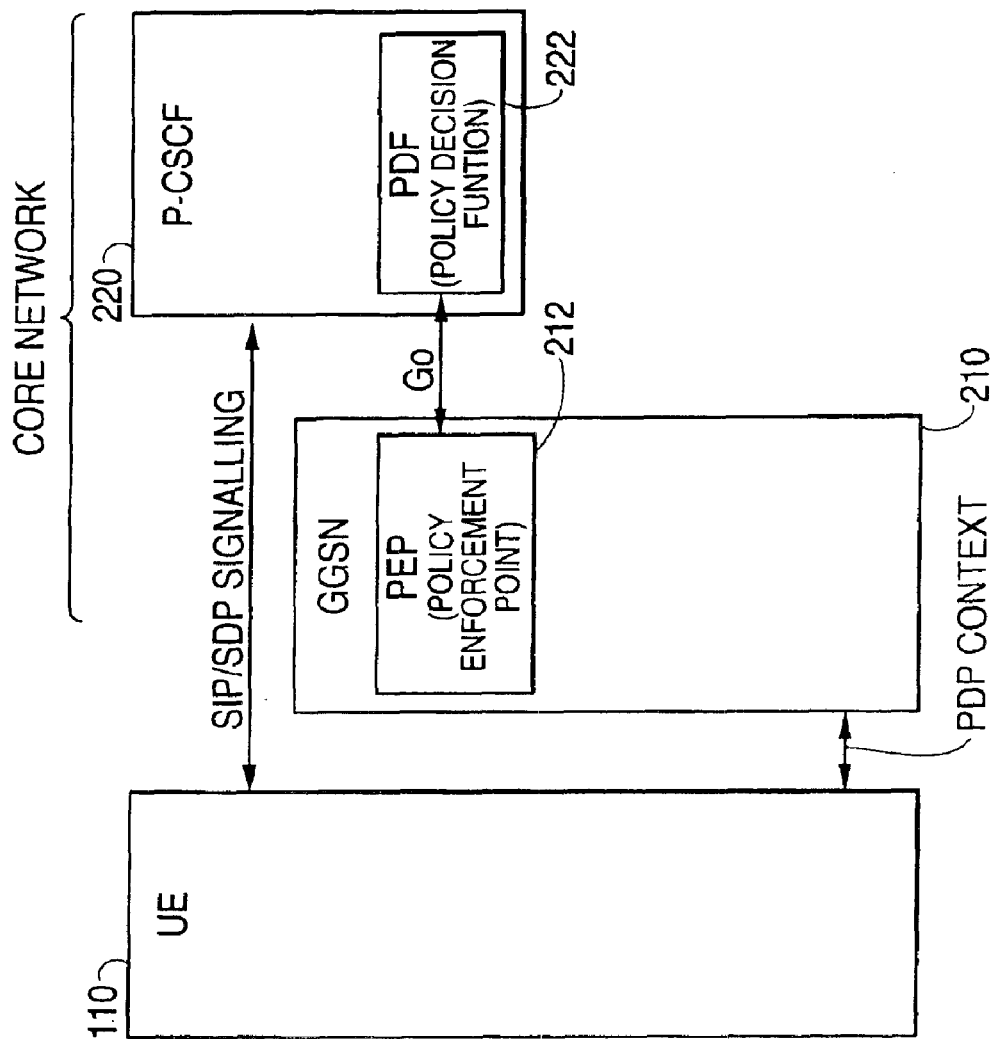
FIG. 2 illustrates an example interface architecture of IMS functional entities according to the 3GPP Specification, Release 5.

FIG. 2 illustrates an example interface architecture of IMS functional entities in mobile networks according to the 3GPP Specification, Release 5. As shown in FIG. 2, the Gateway GPRS (general packet radio service) Support Node (GGSN) 210 and the Proxy Call Session Control Function (P-CSCF) 220 represent network entities that are part of the core network. GGSN 210 may be used to handle the packet transmission to/from the UE 110/120 (e.g., mobile stations). P-CSCF 220 may be used to serve as a first contact point for a given UE 110/120 and to provide session management services and CSCF related procedures, including establishing PDP (Packet Data Protocol, e.g., IP) context for IP multimedia subsystem (IMS) related signaling, registration and other procedures for IMS sessions.

According to the 3GPP Specification, Release 5 (December 2002), a Policy Decision Function (PDF) 222 is integrated into P-CSCF 220 to supervise an IMS session when the UE 110 issues or receives a SIP (Session Initiation Protocol) message containing SDP (Session Description Protocol) signaling to negotiate parameters for an IMS session, make policy decisions based on the IMS session and media related information obtained from the P-CSCF 220, including decisions regarding the maximum authorized traffic class for a given media flow between two users (e.g., mobile terminals), or between a mobile terminal and a server, and then exchange decision information with the GGSN 210 via a Go interface, as set forth in the 3GPP TS 29.207 V.5.2.0 (December 2002) "Policy Control over Go Interface", Release 5. In addition, only a single IMS session is allowed for each PDP (Packet Data Protocol, e.g., IP) context. Alternatively, the PDF may also be implemented in a separate network element that is separate from the P-CSCF 220 as described in the 3GPP Specification, Release 6 (January 2003).

As previously discussed and as set forth in the 3GPP Specification, Release 5, the PDF 222 may be used to generate a set of binding information (especially, an authorization token) to bind the IMS level and the GPRS bearer level of an IMS session, and send the binding information to the GGSN 210, via the user equipment (UE) 110. Binding information associates a PDP (Packet Data Protocol, e.g., IP) context with one or more media components (IP flows) of an IMS session, and is used by the GGSN 210 to request Service-based local policy (SBLP) information from the PDF 222. Such binding information typically includes:

(1) an authorization token sent by the P-CSCF 220 to the UE 110 during SIP/SDP signaling, and (2) one or more flow identifiers (which may be added by the UE 110 after receiving the binding information from the P-CSCF/PDF) used by the UE 110, GGSN 210 and PDF 222 to uniquely identify the IP media flow(s) associated with the SIP session.

Upon receipt of such binding information, the GGSN 210 is then used to search PDF address from the set of binding information (from the authorization token) received from the UE 110, identify the correct PDF and verify that the PDP context operations requested by the UE 110 comply with the preceding negotiation on the IMS level.

In the GGSN 210, the Policy Enforcement Point (PEP) 212 is a logical entity that communicates with the PDF regarding Service-based local policy (SBLP) control. For purposes of simplicity, the GGSN 210 is assumed to contain the PEP 212 implicitly unless otherwise stated. The GGSN 210 sends requests to and receives decisions from the PDF 222. The GGSN 210 may cache the policy decision data of the PDF decisions that may be used later for a local policy decision allowing the GGSN 210 to make policy control decision about the quality of service (QoS) authorization for PDP context modifications without requiring additional interaction with the PDF 222. The PEP functionalities for SBLP in the GGSN are described in, and incorporated by reference herein, the 3GPP TS 29.207 V.5.2.0 (December 2002) "Policy Control over Go Interface", Release 5 and, hence, need not be repeated herein.

Both the UE 110 and the GGSN 210 may also include mechanisms for managing IP quality of service (QoS) endto-end functions and related signaling flows as described in, and incorporated by reference herein, the 3GPP TS 23.207 V.5.6.0 (December 2002) "End-To-End Quality of Service (QoS) Concept and Architecture", Release 5, and the 3GPP TS 29.208 V.5.2.0 (December 2002) "End-To-End Quality of Service (QoS) signaling flows", Release 5. For example, the UE 110 may include a client application (not shown), an IP bearer service (BS) manager (not shown), a translation/mapping function (not shown) and, optionally, a UMTS bearer service (BS) manager (not shown). Likewise, the GGSN 210 may also include an IP BS manager (not shown), a translation/mapping function (not shown) and, optionally, an UMTS BS manager (not shown). IP BS managers typically use standard IP mechanisms to manage IP bearer services. The translation/mapping functions provide interworking between the mechanisms and parameters used within the UMTS bearer services and those used within the IP bearer services, and interact with the IP BS managers. UMTS BS managers use standard UMTS mechanisms to manage UMTS (Universal Mobile Telecommunications System) bearer services and QoS management functions for UMTS bearer services.

In general, a session (connection) is established between user equipments (UEs) (e.g., mobile terminals capable of transmitting and receiving IP multimedia streams) or between a mobile terminal and a server. The session as established between user equipments (UEs) (e.g., mobile terminals), or between a mobile terminal and a server, comprises, for example, a bi-directional audio flow and a unidirectional video flow. The bidirectional audio flow is used for a real-time conversation and, consequently, requires a low delay real-time traffic class, i.e., the CONVERSATIONAL traffic class. The unidirectional video flow is used for transferring moving video pictures in one direction only. Such a unidirectional real-time video flow tolerates longer transmission delays and delay variations (a.k.a., jitter) because the sender does not expect to receive any responses. As a result, the unidirectional real-time flow typically uses a STREAMING traffic class in practice. The CONVERSATIONAL traffic class is characterized by a short maximum transmission delay and delay variation to minimize the delay experienced by the communicating parties (i.e., mobile terminals, or between a mobile terminal and a server), whereas the STREAMING traffic class is characterized by a longer maximum transmission delay and delay variation because there is no real-time two-way communication with expected real-time responses. As a result, the CONVERSATIONAL traffic class is known as "a higher traffic class" relative to the STREAMING traffic class, which is known as "a lower traffic class".

According to the 3GPP TS 23.107, there may be other traffic classes required in the example session, such as INTERACTIVE traffic class and BACKGROUND traffic class. For example, INTERACTIVE traffic class may be characterized by tolerating still longer transmission delays and jitter than the STREAMING traffic class and, is consequently, "a lower traffic class" than the STREAMING traffic class. BACKGROUND traffic class may be characterized by tolerating even longer transmission delays and jitter and, as a result, is still a lower traffic class than the INTERACTIVE traffic class. However, the audio and video streams of the example session, may be carried by the same bearer (e.g., a PDP context in the network system), or may have a temporal relationship with each other, meaning that the bearer resources of the whole session have a CONVERSATIONAL traffic class according to the "highest traffic class" of the session.

After a while, the session may be modified, that is, the communication parties (i.e., mobile terminals, or between a mobile terminal and a server) may desire to terminate, for example, the bi-directional audio flow in the session, while maintaining the unidirectional video flow in the session. The traffic class for bearer resources of the session needs to be changed by the PDF accordingly. For instance, if the session is modified, and the bidirectional audio flow with the CONVERSIONAL traffic class is removed from the session, the unidirectional video flow, with the STREAMING traffic class as a requirement by default, now has the "highest traffic class" of the session. Consequently, the PDF changes (i.e., downgrade) the traffic class for the bearer of the session from CONVERSATIONAL traffic class to STREAMING traffic class.

However, when the session is modified (e.g. from bidirectional audio and unidirectional video to unidirectional video only), and the traffic class is changed by the PDF 222 (for example, from conversational to streaming), some parameters, such as buffer size in the receiving terminal are different in these QoS classes, the change of the traffic class with the inherent change of the transmission delay may cause buffer underflows at the receiving terminal, thereby reducing the quality of the connection perceived by the end user.

For example, when a session (connection) is established, the mobile terminals, or a mobile terminal and a server, start communication with a bi-directional voice stream. At this point, the PDF 222 assigns to the voice stream maximum authorized traffic class equal to CONVERSATIONAL. After some time, one of the mobile terminals, or the mobile terminal and the server, decides to add a video stream in the communication, and the video stream is unidirectional. At this point, the PDF 222 checks the current set of IP multimedia flows belonging to the session (connection) and decides to assign the video stream a maximum authorized traffic class equal to "CONVERSATIONAL". This class is chosen because there is already an existing bidirectional media flow which is authorized up to the "CONVERSATIONAL" traffic class. As a result, the mobile terminal or the server receiving both voice and video streams is able to obtain audio-video synchronization. After some time, the two mobile terminals, or the mobile terminal and the server, decide to drop the voice communication, but continue the unidirectional video transmission. At this point, the PDF 222 checks the current set of IP multimedia flows belonging to the session (only the unidirectional video flow is remaining in the communication) and decides to change its maximum authorized traffic class "STREAMING". This happens because a unidirectional media flow gets always a maximum authorized traffic class equal to "STREAMING".

However, if the maximum authorized traffic class is changed from "CONVERSATIONAL" to "STREAMING", this change would create problems to the mobile terminal or the server receiving the video stream. In particular, the change would cause a PDP context re-negotiation, where not only the traffic class is different, but also the transfer delay is different. As a result, a larger transfer delay could produce frequent and repeated buffer underflows in the receiving mobile terminal, and a non-continuous media resulting in lower quality perceived by the end user. This is because the mobile terminal or server buffer is sized according to the transfer delay of the "CONVERSATIONAL" traffic class, not that of the "STREAMING" traffic class.

Another significant problem may also occur, when a unidirectional (e.g. video) stream is added to an existing session comprising a bidirectional (e.g. audio) stream. The signalled traffic class request of the unidirectional video stream is typically streaming. The traffic class of the bi-directional session is conversational. If the media streams have a temporal relationship (e.g. verbal explanation of the video stream in the audio stream), the difference of the traffic classes will cause a difference in the transmission delays (due to different buffer lengths at the receivers to compensate the different delays and delay jitters in the transmission), thereby reducing the quality of the connection perceived by the end user.

For example, if a session (connection) starts with a unidirectional flow. At this point, the PDF 222 assigns "STREAMING" as maximum authorized traffic class. After some time, a bidirectional voice call flow is added to the communication. At this point, the PDF 222 assigns to the voice flow a maximum authorized traffic class equal to "CONVERSATIONAL". The PDF 222 also re-checks the maximum authorized traffic class of the first existing stream and upgrades to "CONVERSATIONAL." In some cases, the upgrade may trigger a PDP context renegotiation for the IP multimedia flow, particularly, when the IP multimedia streams are related and require synchronization. However, in most cases, upgrading is not required.

Figure 3:
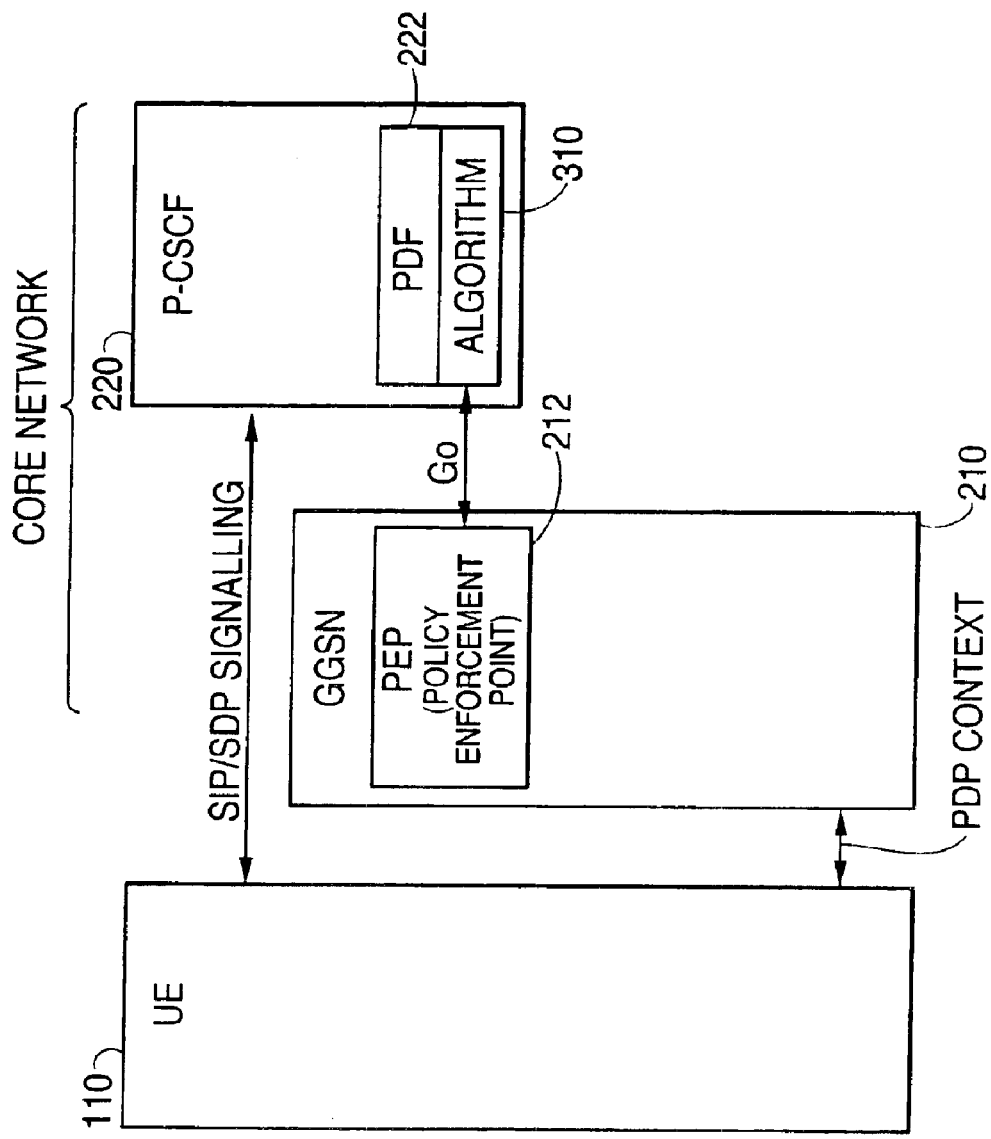
FIG. 3 illustrates an example interface architecture of IMS functional entities according to an embodiment of the present invention.

Turning now to FIG. 3, an example interface architecture of IMS functional entities according to an embodiment of the present invention is illustrated. The interface architecture as shown in FIG. 3, advantageously maintains the used traffic class for the session, i.e., for the rest of the IP multimedia streams, when the media streams requiring the highest traffic class is removed from the session in order to avoid the problem occurred when the traffic class is changed, and to apply the highest (real-time, i.e. conversational, streaming) traffic class, allocated to any of the media streams of the session, to all (real-time) media streams of the session during the lifetime of the session in order to avoid the problem occurred when a media stream is added to an existing session.

As shown in FIG. 3, an algorithm 310 may be implemented as part of the PDF 222, whether the PDF 222 is integrated into the P-CSCF 220 or remains a separate network entity from the P-CSCF 220. In the algorithm 310, the removal of one or several multimedia flows during the lifetime of a session (connection) may be defined so as not to downgrade the previously assigned maximum authorized traffic class and, likewise, the addition of media flows may be defined to allocate the maximum traffic class of the flows to all (real-time) flows of the session (connection). The use of such an algorithm 310 may be applicable to all systems, including all future multimedia networks, in which one session may comprise a plurality of different types of media streams, and may comply, for example, with the 3GPP TS 23.207 V.5.6.0 (December 2002) "End-To-End Quality of Service (QoS) Concept and Architecture", Release 5, and the 3GPP TS 29.208 V.5.2.0 (December 2002) "End-To-End Quality of Service (QOS) signaling flows", Release 5.

Synchronization of real-time media streams can also be improved by eliminating the difference of transmission delays of media streams belonging to the same session, thus improving quality perceived by the end used. There may be a drawback in that the QoS classes allocated to some media streams in the session may be higher than required, thus reducing the overall capacity of the network, and potentially also causing higher connection costs for the end user.

For example, the user/UE starts a session, or extends a session with lower traffic class flows, with (a) unidirectional streaming flow(s). At this point the PDF 222 assigns "STREAMING" as maximum authorized traffic class to the relevant media flows. Later during the lifetime of the session, the user/UE starts a bidirectional (e.g. audio) flow within the same session. At this point, the PDF 222 assigns to the audio flow the maximum authorized traffic class equal to "CONVERSATIONAL". The PDF 222 also re-checks the maximum authorized traffic class of the already existing stream(s). Upgrading the existing media flows to the traffic class value of the new bi-directional flow may be unnecessary, because the unidirectional streaming flows have been started before the bi-directional conversational flow and consequently may not have a temporal relationship with the bi-directional conversational flow. Upgrading is not desired because the QoS classes allocated to some media streams in the session may be higher than required, thus reducing the overall capacity of the network, and potentially also causing higher connection costs for the end user.

However, upgrading can be avoided if unidirectional streaming flow(s) is/are started first, and regarded as independent of a later bidirectional flow or flows, i.e. there is no temporal relationship. No synchronization is then required, i.e. the traffic class will remain "STREAMING," when a bi-directional conversational media stream is added. (In an IMS system, the flows with different traffic/QoS classes will then use separate PDP contexts). Alternatively, if a bidirectional conversational flow is started first and a unidirectional streaming flow is added later to the session, the unidirectional streaming flow is regarded as dependent on the bidirectional, i.e. there is a temporal relationship between them. Synchronization is then required, i.e. the traffic class of the unidirectional streaming flow will be set to the same value as the traffic class of the bi-directional flow, i.e. "CONVERSATIONAL" (by the PDF 222). (In an IMS system, the flows with different traffic/QoS classes can then use a common PDP context or separate PDP contexts).

The PDF 222, as shown in FIG. 3, may be configured to determine the maximum authorized traffic class for a given media flow of a connection between two users or mobile terminals, or between a mobile terminal and a server. An example algorithm 310 in the PDF 222 may include the followings:

If a maximum authorized traffic class has been assigned to a given flow X, then

Addition or removal of one or several media flows during the lifetime of a session (connection) does not produce any change for the previously assigned maximum authorized traffic class for the flow X.

Mapping rules may also be required in compliance with the 3GPP TS 29.208 V.5.2.0 (December 2002) "End-To-End Quality of Service (QoS) signaling flows", Release 5, so that an appropriate maximum authorised QoS Class can be assigned to a streaming service. Such mapping rules may be utilized by the PDF 222, as shown in FIG. 3, when a session is initiated or modified, to obtain the appropriate maximum authorized QoS per media component. However, a proper mapping needs to be defined so as to ensure that future services will not be restricted as well as misuse, fraud and inefficiency can be avoided. In general, a streaming service may be characterized by the direction of the dataflow—it is unidirectional—and by the media type—audio or video. Thus all media components belonging to one session may be analyzed. For example, if all audio and video media components are unidirectional and have the same direction, the application can be considered as streaming and therefore the QoS limits for streaming may apply as maximum authorized QoS.

Figure 4:
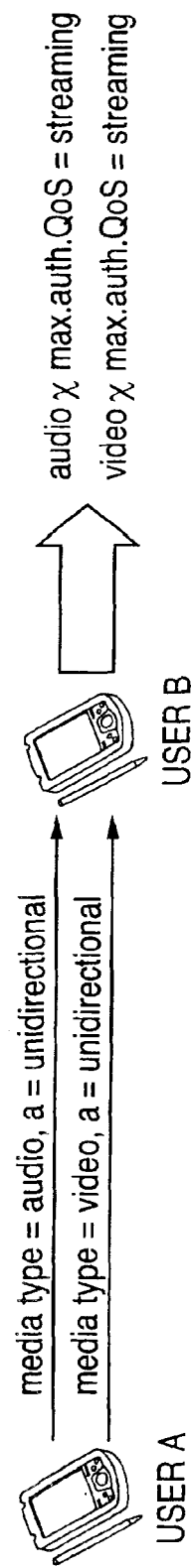
FIG. 4 illustrates an example working session between two user equipments (mobile terminals), or between a mobile terminal and a server, using new mapping rules, when media streams are unidirectional and have the same direction according to an embodiment of the present invention.
Figure 5:
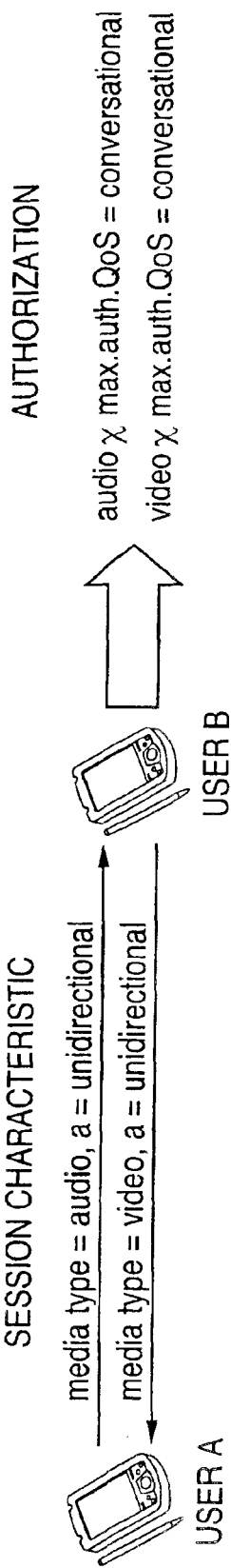
FIG. 5 illustrates an example working session between two user equipments (mobile terminals), or between a mobile terminal and a server, using new mapping rules, when media streams are unidirectional and do not have the same direction according to an embodiment of the present invention.
Figure 6:
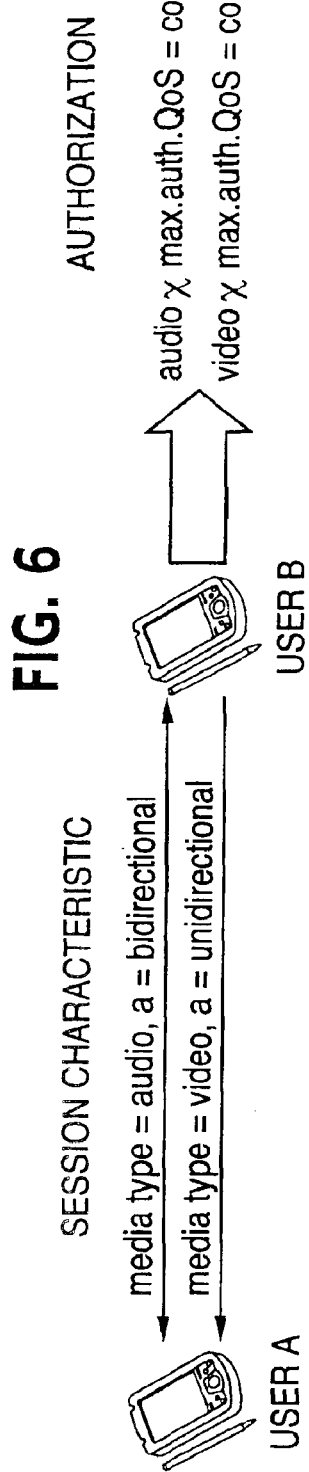
FIG. 6 illustrates an example working session between two user equipments (mobile terminals), or between a mobile terminal and a server, using new mapping rules, when one media stream is bidirectional and the other one unidirectional according to an embodiment of the present invention.
Figure 7:
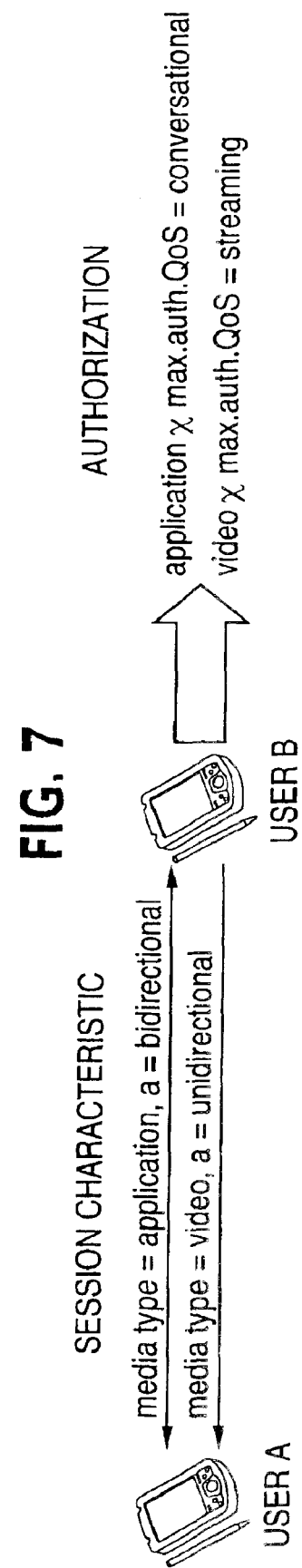
FIG. 7 illustrates an example working session between two user equipments (mobile terminals), or between a mobile terminal and a server, using new mapping rules, when one media stream is bidirectional (non audio/video) and the other one unidirectional (audio/video) according to an embodiment of the present invention.

Referring now to FIGS. 4–7, examples of the mapping rules are shown. For example, FIG. 4 illustrates an example working session between two user equipments (mobile terminals), when media streams are unidirectional and have the same direction according to an embodiment of the present invention. FIG. 5 illustrates an example working session between two user equipments (mobile terminals), when media streams are unidirectional and do not have the same direction according to an embodiment of the present invention. FIG. 6 illustrates an example working session between two user equipments (mobile terminals), when one media stream is bidirectional and the other one unidirectional according to an embodiment of the present invention. Lastly, FIG. 7 illustrates an example working session between two user equipments (mobile terminals), when one media stream is bidirectional (non audio/video) and the other one unidirectional (audio/video) according to an embodiment of the present invention.

Specifically, in FIG. 4, when media streams (audio and video) are unidirectional and have the same direction, the media flow authorization will be "STREAMING". In FIG. 5, when media streams are unidirectional and do not have the same direction, the media flow authorization will be "CONVERSATIONAL." In FIG. 6, when one media stream is bidirectional and the other one unidirectional, the media flow authorization will be "CONVERSATIONAL". In FIG. 7, when one media stream is bidirectional (non audio/video) and the other one unidirectional (audio/video), the media flow authorization will be "CONVERSATIONAL" for application, and "STREAMING" for video.

The mapping rules may be extended to ensure the proper assignment of the maximum authorized QoS Class according to the requested service. The rules defining the mapping of the SDP parameters to the maximum authorized QoS Classes are extended, for example, to allow a mapping to streaming class in case of unidirectional media components of type "audio" or "video" having the same direction. Below are examples of the mapping rules that may be utilized by the UE 110 (e.g., mobile terminal or server) and the PDF 222, as shown in FIG. 2 and FIG. 3. In particular, TABLE #1 illustrates example mapping rules for derivation of the maximum authorized data rates and maximum authorized quality of service (QoS) class per media component in the PDF 222. Such example mapping rules may be packaged in a software module stored or provided on a computer readable medium, or alternatively, may be provided, via Internet download, or integrated into the PDF 222, as shown in FIG. 2 and FIG. 3. In correspondence with TABLE #1, TABLE #2 illustrates example mapping rules for derivation of the maximum authorized bandwidth and the maximum authorized traffic class per media component in the UE 110 (e.g., mobile terminal or server). Likewise, such mapping rules may also be packaged in a software module stored or provided on a computer readable medium, or alternatively, may be provided, via Internet download, or integrated into the UE 110 (e.g., mobile terminal or server), as shown in FIG. 2 and FIG. 3.

TABLE #1

Rules for derivation of the Maximum Authorized Data Rates
and Maximum Authorized QoS Class per media component in the PDF

| Authorized IP QoS Parameter per media component | Derivation from SDP Parameters |
|---|---|
| Maximum Authorized Data Rate DL (Max_DR_DL) and UL (Max_DR_UL) per media component (see note 1) | IF a=recvonly THEN<br>  IF <SDP direction> = mobile originated THEN<br>    Direction:= downlink;<br>  ELSE /* mobile teminated */<br>    Direction:= uplink;<br>  ENDIF;<br>ELSE<br>  IF a=sendonly THEN<br>    IF <SDP direction> = mobile originated THEN<br>      Direction: = uplink;<br>    ELSE /* mobile teminated */<br>      Direction:= downlink;<br>    ENDIF;<br>  ELSE /*sendrecv or no direction attribute*/<br>    Direction:=both;<br>  ENDIF;<br>ENDIF;<br>IF b=AS:<bandwidth> is present THEN<br>  IF Direction=downlink THEN<br>    IF <transport>="RTP/AVP" then<br>      Max_DR_UL:=0.025 * <bandwidth>;<br>      Max_DR_DL:=1.025 * <bandwidth>;<br>    ELSE<br>      Max_DR_UL:=0;<br>      Max_DR_DL:=<bandwidth>;<br>    ENDIF;<br>  ELSE<br>    IF Direction=uplink THEN<br>      IF <transport>="RTP/AVP" then<br>        Max_DR_UL:= 1.025 * <bandwidth>;<br>        Max_DR_DL:=0.025 * <bandwidth>;<br>      ELSE<br>        Max_DR_UL:=<bandwidth>;<br>        Max_DR_DL:=0;<br>      ENDIF; |

TABLE #1-continued

Rules for derivation of the Maximum Authorized Data Rates
and Maximum Authorized QoS Class per media component in the PDF

| Authorized IP QoS Parameter per media component | Derivation from SDP Parameters |
|---|---|
| | ELSE /*Direction=both*/<br>    Max_DR_UL:= 1.025 * <bandwidth>;<br>    Max_DR_DL:= 1.025 * <bandwidth>;<br>  ENDIF;<br> ENDIF;<br>ELSE<br> bw:= as set by the operator;<br> IF Direction=downlink THEN<br>  Max_DR_UL=0;<br>  Max_DR_DL:=bw;<br> ELSE<br>  IF Direction=uplink THEN<br>   Max_DR_UL:=bw;<br>   Max_DR_DL:=0;<br>  ELSE /*Direction=both*/<br>   Max_DR_UL:=bw;<br>   Max_DR_DL:=bw;<br>  ENDIF;<br> ENDIF;<br>ENDIF; |
| Maximum Authorized QoS Class [MaxClass] per media component (see note 2, x and y) | IF (all media components of media type "audio" or "video" for the session are unidirectional and have the same direction) THEN<br>  MaxClassDerivation:=B;    /*streaming*/<br>ELSE<br>  MaxClassDerivation:=A;    /*conversational*/<br>ENDIF;<br>CASE <media> OF<br>  "audio":     MaxClass:= MaxClassDerivation;<br>  "video":     MaxClass:= MaxClassDerivation;<br>  "application": MaxClass:= A;<br>  "data":      MaxClass:=E;    /*interactive with priority 3*/<br>  "control":   MaxClass:=C;    /*interactive with priority 1*/<br>  /*new media type*/<br>  OTHERWISE: MaxClass:=F;    /*background*/<br>END; |

NOTE 1: For a RTP media component the Maximum Authorized Data Rates DL/UL are the sum of the Maximum Authorized Data Rates DL/UL for the RTP media streams and the associated RTCP IP flows DL/UL.

NOTE 2: The Maximum Authorized QoS Class for a RTCP IP flow is the same as for the corresponding RTP media stream.

NOTE x: When an audio or video stream is removed from a session, the remaining media streams in the session shall keep the originally assigned maximum authorized QoS classes.

NOTE y: When an audio or video stream is added to a session, the PDF shall derive the maximum authorized QoS class taking into account the already existing media streams within the session.

The PDF 222 shall, per ongoing session, store the Authorized IP QoS parameters per media component. When the GGSN 210 requests the authorized UMTS QoS parameters for an activated/modified PDP Context carrying one or more media component(s), the PDF 222 may use the mapping rules, as shown, for example, in TABLE #1, so as to calculate the authorized IP QoS parameters.

TABLE #2

Rules for derivation of the Maximum Authorized Bandwidth DL/UL
and the Maximum Authorized Traffic Class per media component in the UE

| Authorized UMTS QoS Parameter per media component | Derivation from SDP Parameters |
|---|---|
| Maximum Authorized Bandwidth DL (Max_BW_DL) and UL (Max_BW_UL) per media component | /* Check if IMS context (the criteria for this check is an UE manufactures issue ) */<br>IF IMS context THEN<br> IF a=recvonly THEN<br>  IF <SDP direction> = mobile originated THEN<br>   Direction:= downlink;<br>  ELSE /* mobile teminated */<br>   Direction:= uplink;<br>  ENDIF; |

TABLE #2-continued

Rules for derivation of the Maximum Authorized Bandwidth DL/UL
and the Maximum Authorized Traffic Class per media component in the UE

| Authorized UMTS QoS Parameter per media component | Derivation from SDP Parameters |
|---|---|
| | ELSE;<br>  IF a=sendonly THEN<br>    IF <SDP direction> = mobile originated THEN<br>      Direction: = uplink;<br>    ELSE /* mobile teminated */<br>      Direction:= downlink;<br>    ENDIF;<br>  ELSE /*sendrecv or no direction attribute*/<br>    Direction:=both;<br>  ENDIF;<br>ENDIF;<br>IF b=AS:<bandwidth> is present THEN<br>  IF Direction=downlink THEN<br>    IF <transport>="RTP/AVP" then<br>      Max_BW_UL:=0.025 * <bandwidth>;<br>      Max_BW_DL:=1.025 * <bandwidth>;<br>    ELSE<br>      Max_BW_UL:=0;<br>      Max_BW_DL:=<bandwidth>;<br>    ENDIF;<br>  ELSE<br>    IF Direction=uplink THEN<br>      IF <transport>="RTP/AVP" then<br>        Max_BW_UL:= 1.025 * <bandwidth>;<br>        Max_BW_DL:=0.025 * <bandwidth>;<br>      ELSE<br>        Max_BW_UL:=<bandwidth>;<br>        Max_BW_DL:=0;<br>      ENDIF;<br>    ELSE /*Direction=both*/<br>      Max_BW_UL:= 1.025 * <bandwidth>;<br>      Max_BW_DL:= 1.025 * <bandwidth>;<br>    ENDIF;<br>  ENDIF;<br>ELSE<br>  bw:= as set by the UE manufacturer;<br>  IF Direction=downlink THEN<br>    Max_BW_UL:=0;<br>    Max_BW_DL:= bw;<br>  ELSE<br>    IF Direction=uplink THEN<br>      Max_BW_UL:= bw;<br>      Max_BW_DL:=0;<br>    ELSE /*Direction=both*/<br>      Max_BW_UL:= bw;<br>      Max_BW_DL:= bw;<br>    ENDIF;<br>  ENDIF;<br>ENDIF;<br>ELSE<br>  No authorization is done;<br>ENDIF |
| Maximum Authorized Traffic Class [MaxTrafficClass] per media component (see NOTE x and y) | /* Check if IMS context (the criteria for this check is an UE manufactures issue) */<br>IF IMS context THEN<br>  IF (all media components of media type "audio" or "video" for the session are unidirectional and have the same direction) THEN<br>    MaxService:= streaming;<br>  ELSE<br>    MaxService:= conversational;<br>  ENDIF;<br>  CASE <media> OF<br>    "audio":      MaxTrafficClass:= MaxService;<br>    "video":      MaxTrafficClass:= MaxService;<br>    "application":  MaxTrafficClass:= conversational;<br>    "data":       MaxTrafficClass:=interactive with priority 3;<br>    "control":    MaxTrafficClass:=interactive with priority 1;<br>    /*new media type*/<br>    OTHERWISE:  MaxTrafficClass:=background;<br>  END;<br>ELSE<br>  No authorization is done;<br>ENDIF |

TABLE #2-continued

Rules for derivation of the Maximum Authorized Bandwidth DL/UL
and the Maximum Authorized Traffic Class per media component in the UE

| Authorized UMTS QoS Parameter per media component | Derivation from SDP Parameters |
|---|---|
| NOTE x: | When an audio or video stream is removed from a session, the remaining media streams shall keep the originally assigned maximum authorized traffic classes. |
| NOTE y: | When an audio or video stream is added to a session, the UE shall derive the maximum authorized traffic class taking into account the already existing media streams within the session. |

The UE 110 shall, per ongoing session, store the authorized UMTS QoS parameters per media component. Before activating or modifyingPDP context, the UE 110 may check that the requested Guaranteed Bit-rate UL/DL (if the Traffic Class is Conversational or Streaming) or the requested maximum bit rate UL/DL (if the Traffic Class is Interactive or Background) does not exceed the maximum authorized bandwidth UL/DL per PDP context (calculated according to the mapping rules). Furthermore, the UE 110 may check so that the requested UMTS QoS parameter traffic class does not exceed the maximum authorized traffic class per PDP context (calculated according to the mapping rules).

As described from the foregoing, the network interface architecture according to an embodiment of the present invention provides solutions for dynamic media authorization and better management of QoS classes of a session (connection between users or mobile terminals, or between a mobile terminal and a server) comprising a plurality of different type of media streams within mobile networks such that, when one or several media streams within a plurality of different types of media streams are modified (new ones started and existing ones deleted) during the session, the traffic class of a session is defined by the highest traffic class requirement by the media flows belonging to the same session in order to eliminate the difference of transmission delays of media streams belonging to the same session and, therefore, improving the quality of the connection perceived by the end user. Synchronization of real-time media streams can also be improved by eliminating the difference of transmission delays of media streams belonging to the same session, thus improving quality perceived by the end used.

While there have been illustrated and described what are considered to be example embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A Policy Decision Function (PDF) implemented in a mobile network to determine a maximum authorized traffic class for a given media flow of a session between two mobile terminals, or between a mobile terminal and a server, comprising:

determining if a media stream requiring the highest traffic class within a plurality of media streams is removed from a session, when the session established is modified between two mobile terminals or between a mobile terminal and a server, via a communication link; and maintaining the existing traffic class for the remaining media streams for the session, if the media stream requiring the highest traffic class is removed from the session.

2. A Policy Decision Function (PDF) implemented in a mobile network to determine a maximum authorized traffic class for a given media flow of a session between two mobile terminals or between a mobile terminal and a server, comprising:

determining if a unidirectional stream is added to a session comprising a bidirectional stream, when the session is established or modified between two mobile terminals or between a mobile terminal and a server, via a communication link; and applying the highest traffic class, allocated to any of media streams of the session, to all media streams of the session during the lifetime of the session, if the unidirectional stream is added to the session comprising the bidirectional stream.

3. An IP Multimedia Subsystem (IMS) architecture for IP multimedia services, comprising:

mobile terminals;

a gateway support node (GGSN) configured to handle packet transmission to/from the mobile terminals during a session; and a proxy call session control function (P-CSCF) configured to serve as a first contact point of the mobile terminals and provide session management services during the session, including establishing a packet data protocol (PDP) context for IMS related signaling, registration, and other procedures for the session, wherein said P-CSCF comprises a Policy Decision Function (PDF) configured to perform the following:

determining if a media stream requiring the highest traffic class within a plurality of media streams is removed from the session, when the session established is being modified between two mobile terminals or between a mobile terminal and a server, via a communication link; and maintaining the used traffic class for the remaining media streams for the session, if the media stream requiring the highest traffic class is removed from the session.

4. A computer readable medium comprising instructions that, when executed by a mobile network, perform a method of determining a maximum authorized traffic class for a given media flow of a session between two mobile terminals, or between a mobile terminal and a server, said method comprising:

determining if a unidirectional stream is added to a session comprising a bi-directional stream, when the session is established or modified between two mobile terminals, or between a mobile terminal and a server, via a communication link; and applying the highest traffic class, allocated to any of media streams of the session, to all media streams of the session during the lifetime of the session, if the unidirectional stream is added to the session comprising the bidirectional stream.

* * * * *